(12) United States Patent
Lorey

(10) Patent No.: US 8,894,152 B2
(45) Date of Patent: Nov. 25, 2014

(54) VEHICLE SEAT WITH FLUID SPRING

(75) Inventor: Konstantin Lorey, Schmidgaden (DE)

(73) Assignee: Grammer AG, Amberg (DE)

( * ) Notice: Subject to any disclaimer, the term of this patent is extended or adjusted under 35 U.S.C. 154(b) by 354 days.

(21) Appl. No.: 13/271,974

(22) Filed: Oct. 12, 2011

(65) Prior Publication Data

US 2012/0091773 A1   Apr. 19, 2012

(30) Foreign Application Priority Data

Oct. 13, 2010   (DE) .......................... 10 2010 048 210

(51) Int. Cl.
*A47C 3/30*   (2006.01)
*B60N 2/50*   (2006.01)
*B60N 2/52*   (2006.01)

(52) U.S. Cl.
CPC .............. *B60N 2/508* (2013.01); *B60N 2/502* (2013.01); *B60N 2/505* (2013.01); *B60N 2/527* (2013.01)
USPC ....................... 297/344.16; 248/421; 267/133

(58) Field of Classification Search
USPC ................ 297/344.16, 344.19; 248/421, 422; 267/117, 132, 133
See application file for complete search history.

(56) References Cited

U.S. PATENT DOCUMENTS

| | | |
|---|---|---|
| 2,118,456 A | 5/1938 | Whedon |
| 3,300,203 A | 1/1967 | Carter et al. |
| 3,704,767 A | 12/1972 | Takagi |
| 3,706,362 A | 12/1972 | Faure |
| 3,752,432 A | 8/1973 | Lowe |
| 4,151,973 A | 5/1979 | Sedlock |
| 4,213,594 A | 7/1980 | Pietsch et al. |
| 4,286,765 A | 9/1981 | Delgleize et al. |
| 4,350,317 A | 9/1982 | Aondetto |
| 4,408,744 A | 10/1983 | Thompson |
| 4,451,079 A | 5/1984 | Takahashi |
| 4,477,050 A | 10/1984 | Thompson et al. |
| 4,573,657 A | 3/1986 | Sakamoto |
| 4,645,169 A | 2/1987 | Mischer |
| 4,679,760 A | 7/1987 | Dotzler et al. |
| 4,684,100 A | 8/1987 | Grassl |

(Continued)

FOREIGN PATENT DOCUMENTS

| | | |
|---|---|---|
| CN | 100493951 C | 6/2009 |
| DE | 1 898 307 U | 8/1964 |

(Continued)

OTHER PUBLICATIONS

Office Action for German patent application No. 10 2010 048 210.2, mailed Jul. 7, 2011.

(Continued)

*Primary Examiner* — Anthony D Barfield
(74) *Attorney, Agent, or Firm* — Lathrop & Gage LLP

(57) ABSTRACT

The invention relates to a vehicle seat (1) with an upper part (5) and a lower part (6) and a frame (4) arranged between them and vertically adjustable by means of at least one fluid spring (11) capable of being retracted and extended, wherein a component (17) with at least one element (24) of resilient material for the damping of vibrating movements of the vehicle seat (1) is provided, wherein the component (17) is connected to a first end (20) of the fluid spring (11) and the upper part (5) of the seat or the lower part (6) of the seat.

12 Claims, 4 Drawing Sheets

(56) References Cited

U.S. PATENT DOCUMENTS

Figure 1:
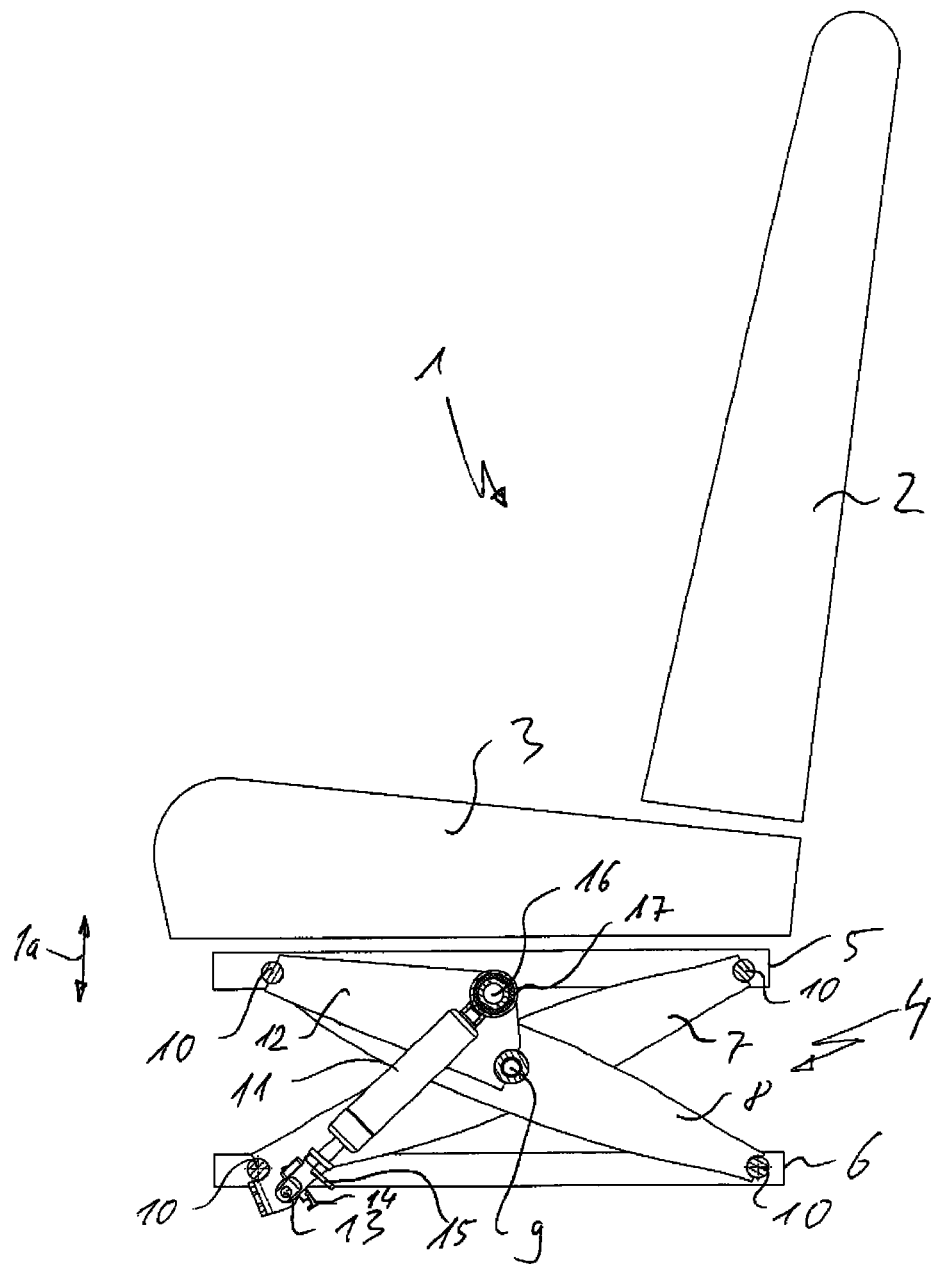

| | | |
|---|---|---|
| 4,729,539 A | 3/1988 | Nagata |
| 4,773,671 A | 9/1988 | Inagaki |
| 4,784,434 A | 11/1988 | Iwami |
| 4,834,416 A | 5/1989 | Shimoe et al. |
| 4,856,763 A | 8/1989 | Brodersen et al. |
| 4,943,037 A | 7/1990 | Brodersen et al. |
| 4,961,482 A | 10/1990 | Pohlenz et al. |
| 4,993,778 A | 2/1991 | Colin et al. |
| 5,058,852 A | 10/1991 | Meier et al. |
| 5,125,631 A | 6/1992 | Brodersen et al. |
| 5,211,369 A | 5/1993 | Hoemer |
| 5,251,864 A | 10/1993 | Itou |
| 5,364,060 A | 11/1994 | Donovan et al. |
| 5,521,821 A | 5/1996 | Shimizu et al. |
| 5,533,703 A | 7/1996 | Grassl et al. |
| 5,553,911 A | 9/1996 | Bodin et al. |
| 5,582,385 A | 12/1996 | Boyle et al. |
| 5,735,509 A | 4/1998 | Gryp et al. |
| 5,765,802 A | 6/1998 | Bostrom et al. |
| 5,791,738 A | 8/1998 | Niezoldt |
| 5,794,911 A | 8/1998 | Hill |
| 5,871,198 A | 2/1999 | Bostrom et al. |
| 5,957,426 A | 9/1999 | Brodersen |
| 5,967,604 A | 10/1999 | Yoshida et al. |
| 5,971,116 A | 10/1999 | Franklin |
| 6,042,093 A | 3/2000 | Garelick |
| 6,202,972 B1 * | 3/2001 | Manavi .................. 248/421 |
| 6,340,201 B1 | 1/2002 | Higuchi |
| 6,478,102 B1 | 11/2002 | Puterbaugh et al. |
| 6,543,755 B2 | 4/2003 | Monson et al. |
| 6,616,116 B1 | 9/2003 | Rochau et al. |
| 6,637,735 B2 | 10/2003 | Monson et al. |
| 6,763,550 B2 | 7/2004 | Regnier |
| 6,802,408 B2 | 10/2004 | Krammer |
| 7,044,553 B2 | 5/2006 | Ropp |
| 7,152,839 B2 | 12/2006 | Mullinix et al. |
| 7,168,671 B2 | 1/2007 | Bostrom et al. |
| 7,185,867 B2 | 3/2007 | Hill et al. |
| 7,377,533 B2 | 5/2008 | Takeuchi et al. |
| 7,413,158 B1 * | 8/2008 | Burer .................. 248/421 |
| 7,712,836 B2 | 5/2010 | Deml |
| 7,810,884 B2 | 10/2010 | Lorey et al. |
| 7,886,882 B2 | 2/2011 | Behmenburg et al. |
| 7,942,248 B2 | 5/2011 | St. Clair et al. |
| 8,118,287 B2 | 2/2012 | Schordine |
| 8,457,841 B2 | 6/2013 | Knoll et al. |
| 2001/0035600 A1 | 11/2001 | St. Clair |
| 2002/0011699 A1 | 1/2002 | St.Clair |
| 2006/0243548 A1 | 11/2006 | Stein et al. |
| 2006/0278805 A1 | 12/2006 | Haller |
| 2007/0278723 A1 | 12/2007 | Shoemaker et al. |
| 2008/0000738 A1 | 1/2008 | Zdeb |
| 2008/0000739 A1 | 1/2008 | Behmenburg et al. |
| 2008/0088165 A1 | 4/2008 | Deml |
| 2008/0156602 A1 | 7/2008 | Hiemenz et al. |
| 2008/0197684 A1 | 8/2008 | Ott et al. |
| 2009/0134595 A1 | 5/2009 | Haller et al. |
| 2009/0179390 A1 | 7/2009 | Wurmthaler et al. |
| 2009/0184448 A1 | 7/2009 | Hiser |
| 2009/0256293 A1 | 10/2009 | Ward |
| 2009/0283944 A1 | 11/2009 | Schordine |
| 2010/0052356 A1 | 3/2010 | Lewis, II |
| 2010/0072685 A1 | 3/2010 | Golpe et al. |
| 2010/0072800 A1 | 3/2010 | Weber et al. |
| 2010/0102493 A1 | 4/2010 | Deml et al. |
| 2010/0117428 A1 | 5/2010 | Deml et al. |
| 2011/0001033 A1 | 1/2011 | Kohl et al. |
| 2011/0001342 A1 | 1/2011 | Deml et al. |
| 2011/0022265 A1 | 1/2011 | Sekiya |
| 2011/0226930 A1 | 9/2011 | Enns et al. |
| 2011/0278894 A1 | 11/2011 | Lorey |
| 2012/0025577 A1 | 2/2012 | Kolb |
| 2012/0043798 A1 | 2/2012 | Haller et al. |
| 2012/0049421 A1 | 3/2012 | Haller et al. |
| 2012/0086159 A1 | 4/2012 | Kolb |
| 2012/0090930 A1 | 4/2012 | Haller |
| 2012/0091773 A1 | 4/2012 | Lorey |
| 2012/0126592 A1 | 5/2012 | Kaessner et al. |
| 2012/0153689 A1 | 6/2012 | Haller et al. |
| 2012/0153695 A1 | 6/2012 | Haller et al. |
| 2012/0187615 A1 | 7/2012 | Haller et al. |

FOREIGN PATENT DOCUMENTS

| | | |
|---|---|---|
| DE | 15 55 056 | 3/1970 |
| DE | 19 16 403 A1 | 10/1970 |
| DE | 2022021 | 11/1970 |
| DE | 21 13 579 | 10/1972 |
| DE | 28 06 247 C2 | 8/1979 |
| DE | 28 11 034 A1 | 9/1979 |
| DE | 28 51 129 A1 | 6/1980 |
| DE | 3122311 | 3/1982 |
| DE | 32 42 287 A1 | 5/1984 |
| DE | 35 17 345 A1 | 11/1986 |
| DE | 3707162 | 10/1987 |
| DE | 3813402 | 11/1989 |
| DE | 38 24 272 A1 | 3/1990 |
| DE | 41 01 221 A1 | 7/1992 |
| DE | 9402417 | 4/1994 |
| DE | 696 06 732 T2 | 4/1995 |
| DE | 197 56 252 A1 | 7/1998 |
| DE | 197 41 602 A1 | 3/1999 |
| DE | 19907658 | 8/2000 |
| DE | 603 20 456 T2 | 12/2002 |
| DE | 699 08 290 | 5/2004 |
| DE | 10347219 | 5/2005 |
| DE | 10 2005 028 725 A1 | 1/2006 |
| DE | 10 2006 016 047 B3 | 4/2006 |
| DE | 10 2005 003 833 | 6/2006 |
| DE | 10 2005 011 856 B3 | 8/2006 |
| DE | 102005033596 | 2/2007 |
| DE | 602005001868 | 12/2007 |
| DE | 10 2007 030 467 A1 | 1/2009 |
| DE | 102008040011 | 5/2009 |
| DE | 10 2008 016 685 B3 | 6/2009 |
| DE | 10 2008 010 719 A1 | 8/2009 |
| DE | 10 2008 045 492 A1 | 3/2010 |
| DE | 10 2008 052 960 | 4/2010 |
| DE | 10 2008 056 200 A1 | 5/2010 |
| DE | 10 2009 020 034 A1 | 11/2010 |
| DE | 10 2009 040 010 A1 | 1/2011 |
| EP | 0 054 880 A1 | 12/1981 |
| EP | 0 054 947 A1 | 12/1981 |
| EP | 0 089 794 | 9/1983 |
| EP | 0 448 340 A2 | 9/1991 |
| EP | 0 739 766 | 10/1996 |
| EP | 1 035 258 A1 | 6/1999 |
| EP | 2 420 404 | 2/2012 |
| GB | 1 166 258 | 10/1969 |
| GB | 1199577 | 7/1970 |
| GB | 1 383 922 | 2/1974 |
| GB | 2 014 522 | 8/1979 |
| JP | 63220026 A | 9/1988 |
| JP | 1237471 A | 9/1989 |
| JP | 09136611 | 5/1997 |
| JP | 2007 062 539 A | 3/2007 |
| WO | WO 2004/110808 | 12/2004 |

OTHER PUBLICATIONS

Office Action for German patent application No. 10 2010 051 325.3, mailed Oct. 10, 2011.

Office Action for German Patent Application No. 10 2010 055 342.5, mailed Oct. 6, 2011.

Extended European Search Report for parallel European Patent Application No. 11 19 5031, mailed Apr. 5, 2012.

Office Action for German Patent Application No. 10 2010 055 344.1, mailed Oct. 5, 2011.

Examination Report dated Aug. 24, 2012, from the German Patent Office for German Patent Application No. 10 2010 026 569.1.

First Office Action dated Mar. 29, 2012 for Chinese Patent Application No. 201010244916.3.

(56) References Cited

OTHER PUBLICATIONS

First Office Action dated Mar. 29, 2012 for Chinese Patent Application No. 201010244916.3, English translation.
Office Action, Chinese Patent Application No. 201110052443.1, dated Dec. 30, 2012.
Office Action, Chinese Patent Application No. 201110052443.1, dated Dec. 30, 2012, English Translation.
Extended European Search Report for parallel European Patent Application No. 11 19 5039, mailed Apr. 5, 2012.
Examination Report for German Patent Application No. 10 2011 009 530.6 dated May 4, 2012.
Extended European Search Report for European Patent Application No. 12 15 9863, dated Jul. 4, 2012.
Office Action for German Patent Application No. 10 2011 015 364.0, mailed Feb. 6, 2012.
Search Report for European Patent Application No. 11177689.4, mailed Dec. 14, 2011.
Office Action for German Patent Application No. 10 2010 035 888.6 mailed Jun. 9, 2011.
European Search Report for European Patent Application No. 12 159 863.5, mailed Jul. 10, 2013.
Office, Action corresponding to German Patent Application No. 102010045114.2, completed Nov. 8, 2013.
German Examination Report, dated Apr. 23, 2014, for German patent application serial No. 102010048210.2, a related application, 7 pp.

* cited by examiner

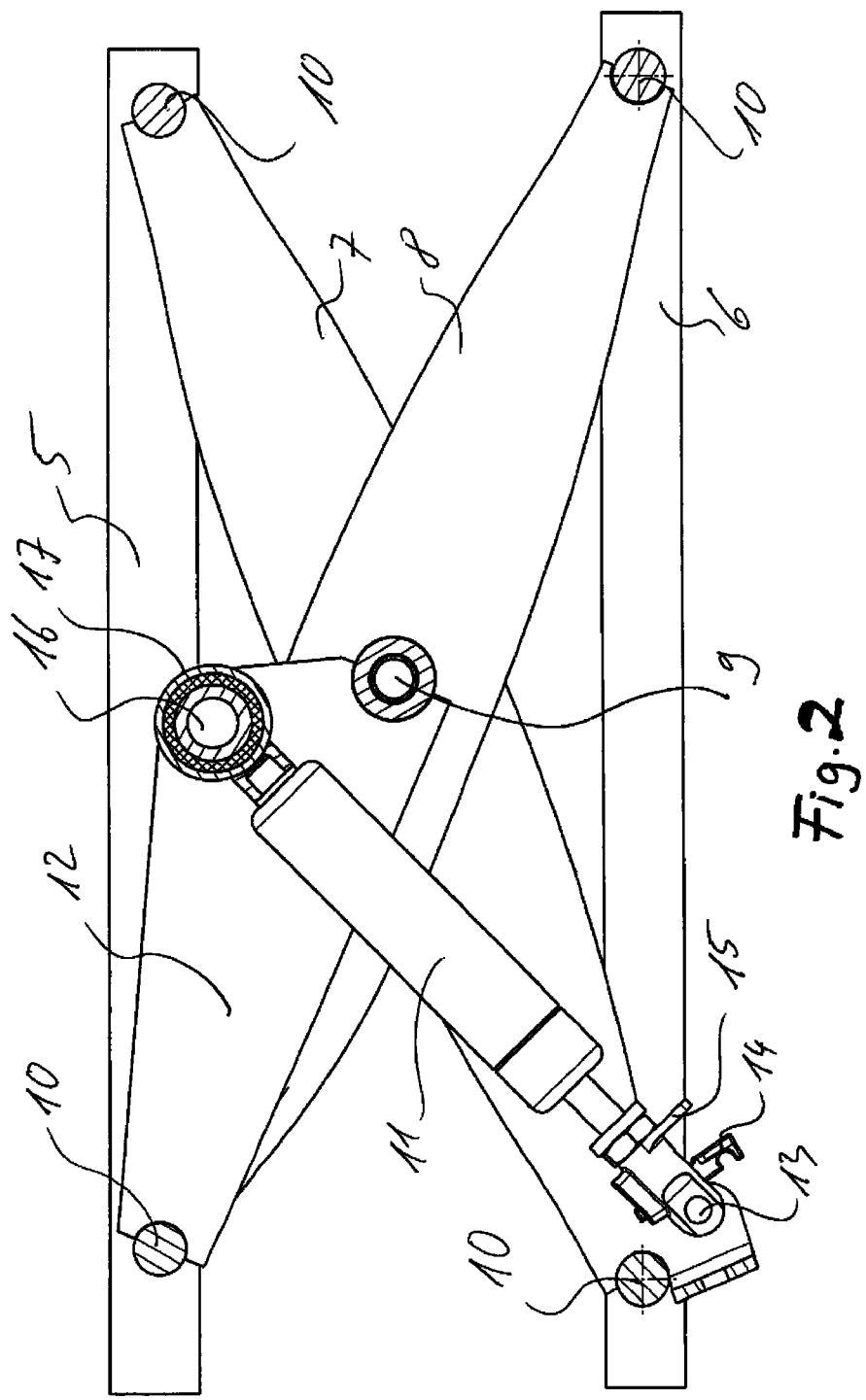

VEHICLE SEAT WITH FLUID SPRING

CROSS REFERENCE TO RELATED APPLICATION

This application claims the benefit of priority from German Patent Application No. 10 2010 048 210.2, filed Oct. 13, 2010, which is hereby incorporated by reference in its entirety.

DESCRIPTION

The invention relates to a vehicle seat with an upper part and a lower part and a vertically adjustable frame—arranged between them—by means of at least one fluid spring capable of being retracted and extended, according to the preamble of claim 1.

Vehicle seats with so-called fluid springs capable of being locked, such as gas springs, are known. Fluid or gas springs of this type are used primarily to adjust the vehicle seat in its height by retracting and extending the spring and, after height adjustment has taken place, to occupy a locked state. In this locked state the fluid spring can act upon the vehicle seat so as to damp to a greater or lesser extent whilst initiating a vibration from below or from above in dependence upon the fluid used.

By way of example, oil-filled fluid springs, which are arranged between a lower part of the seat and the upper part of the seat, have little damping effect on account of the oil properties. This has the consequence that there is a low degree of sitting comfort for the person using the vehicle seat as well as an undesirable high loading of the vehicle structure as a whole with forces in the event of the action of external forces by the person or by external vibrations. This leads in an undesired manner to a relatively short fatigue limit.

Even if other fluids, such as different gases, are used for the fluid spring, there is a high risk of an undesirably short fatigue limit, since, on account of the vibrations introduced, fluid springs of this type which are capable of being locked undergo an undesirably high loading as gas springs capable of being locked in a soft manner.

The object of the invention is thus provide a vehicle seat with an upper part and a lower part as well as a fluid spring which is capable of being moved in and out and which is capable of being fixed in a position, which vehicle seat providing in a locked position of the fluid spring an increased sitting comfort and a high degree of loading of the seat structure and of the fluid spring.

This object is achieved by the features of claim 1.

An essential feature of the invention is the fact that, in the case of a vehicle seat with an upper part and a lower part and a vertically adjustable frame—arranged between them—by means of at least one fluid spring capable of being retracted and extended, wherein a component is provided which has at least one element of resilient and/or elastic material for the damping of vibrating movements of the vehicle seat, the component being connected to a first end of the fluid spring and to the upper part of the seat or the lower part of the seat. A vehicle seat of this type ensures that, in addition to the fluid spring capable of being locked or blocked in a specified vertical position of the vehicle seat, there is an adequate damping for vehicle vibrations and vibrations introduced into the vehicle from below, even if the fluid spring used is a spring which is filled with oil and which on account of the sealing properties of the oil used causes a very low vibration damping.

The component is preferably built up in the shape of a multiple-layer cylinder, in which case a centre axis of the cylinder extending in the longitudinal direction extends at a right angle to a longitudinal axis of the fluid spring. In this way, the component in the shape of a cylinder can be used at the same time in order to be attached to the upper part of the seat or alternatively to the lower part of the seat in a manner pivotable about the centre axis of cylinder, so that the fluid spring together with the cylinder connected to it in a fixed manner may be suspended in a pivotable manner both at the one end, namely in the region of the cylinder, and at an end of the fluid spring opposite this end. This has the effect that the fluid spring together with the cylinder performs a pivoting movement during the vertical displacement of the vehicle seat and during a damping vibration movement of the vehicle seat and can thus be arranged obliquely with respect to the vertical direction of the vehicle seat in the region of the vertically displaceable frame, in order to achieve in this way a saving in space in the design of the fluid spring with a long length of stroke path.

It is preferable for the cylinder to be built up in such a way that on the inside it comprises a plastics material part in the shape of a hollow cylinder, an intermediate part of the resilient material in the shape of a cylinder jacket arranged thereon and a casing part surrounding the intermediate part in the manner of a cylinder jacket, wherein the casing part can have projections on the outside in order to secure the fluid spring thereto with suitable means.

The intermediate part of resilient and/or elastic material thus carries out the damping of the vibrations introduced into the vehicle and of the vertical movements of the vehicle seat which occur during the vibration. It is preferable for the resilient material used to be a PU foam, such as Cellasto, as an energy-absorbing material. Alternatively or additionally materials such as further PU foam materials, for example Sylomer and the like, may be used. In the same way, the use of materials such as rubber, foam rubber or other materials customarily used for metal rubber bearings or an elastomer is possible. An hydraulic bearing is also possible for additional components of this type designed in the manner of a cylinder.

It is preferable for the individual layers of the cylinder, i.e. the plastics material part, the intermediate part and the casing part to be glued together by means of a suitable adhesive, so that a durable, fixed join between the individual layers is provided, so as to form a long-lasting cylinder component.

In accordance with a preferred embodiment, the intermediate part, which is of resilient material, is arranged between the plastics material part and the casing part with pre-stressing as viewed in the radial direction. Instead of using an adhesive between the plastics material part and the intermediate part it is possible for the plastics material part, which preferably consists of a PIR resin, to be subsequently cast in a liquid state in the cylinder component. The intermediate part is then applied in an adhering manner to the outer surface of the cylindrical plastics material part after the pressing in has taken place with pre-stressing into the intermediate space between the casing part and the plastics material part, so that the use of an adhesive is not necessary.

In accordance with a preferred embodiment the plastics material part in the shape of a hollow cylinder is made longer in the direction of the centre axis of the cylinder than the intermediate part and the casing part. This permits an optimum mounting of the intermediate part of resilient material, without it being able to slip down beyond the longitudinal ends of the plastics material part.

The casing part is fastened to the fluid spring preferably by means of a threaded bore situated at a right angle to the centre axis of the cylinder, wherein the first end of the fluid spring having a rod thread designed in a complementary manner for fastening in the threaded bore.

Metal can be used for example as a material for the casing part, as is provided by the use of aluminium extrusion material, steel, die-cast aluminium and the like.

Figure 3A:
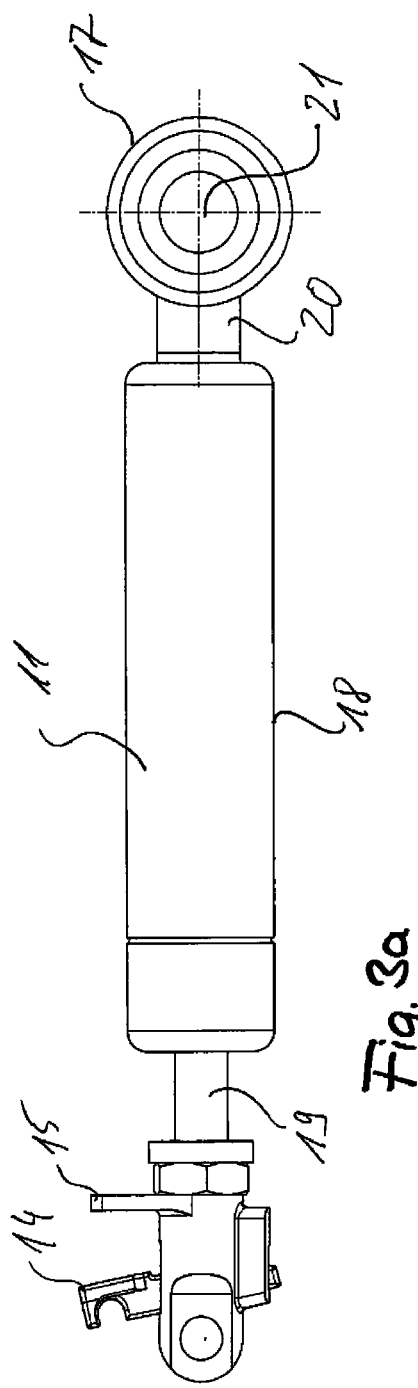
Figure 3B:
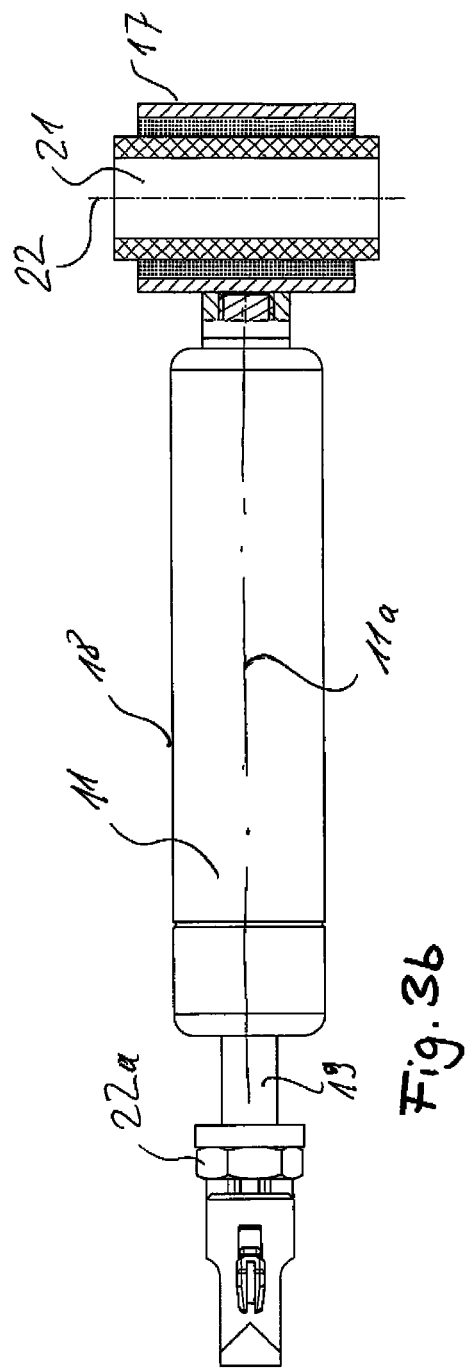
Figure 4B:
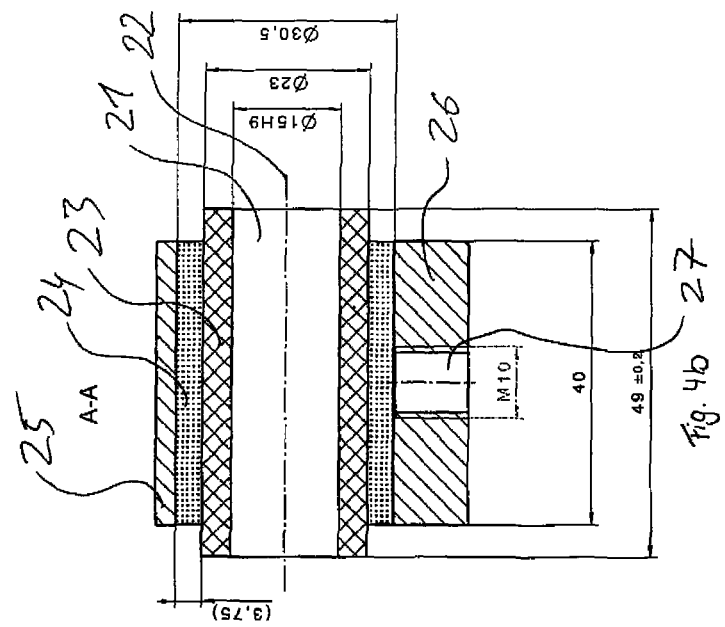
Figure 4A:
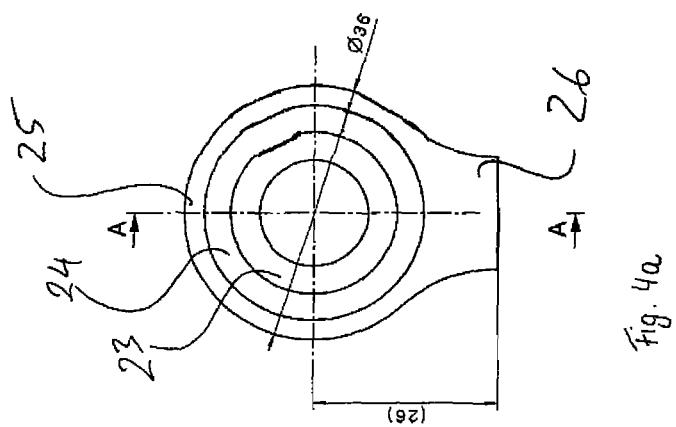

Further advantageous embodiments will emerge from the dependent claims. Advantages and expedient features are likewise evident in conjunction with the drawing, in which FIG. 1 is a side view of a vehicle seat in accordance with a preferred embodiment of the invention;

FIG. 2 is a side view of a vertically adjustable frame for the vehicle seat in accordance with the embodiment according to the invention;

FIGS. 3a and 3b are side views of a fluid spring together with a component for use in the vehicle seat according to the invention, and FIGS. 4a and 4b are cut-out views of the combination—shown in FIGS. 3a and 3b—of the fluid spring and the component, in order to clarify the structure of the component.

A vehicle seat 1 in accordance with a preferred embodiment of the invention is shown in a side view in FIG. 1. The vehicle seat 1 has a backrest 2 and a seat part 3, wherein a vertically adjustable frame 4 with two scissor arms 7 and 8 being arranged between an upper part 5 of the seat and a lower part 6 of the seat.

The vertically adjustable frame 4 is mounted so as to be pivotable with the scissor arms 7 and 8 about a common fulcrum 9. Additional fulcra 10, which can be arranged inside the upper part 5 of the seat and/or the lower part 6 of the seat so as to be displaceable at least in part in the longitudinal direction of the seat, are likewise used for a pivoting movement of the frame 7, 8.

A fluid spring 11, which can be built up as a gas spring, is arranged in an oblique position in the region of the frame 4, wherein it is suspended in a pivotable manner at fulcra 16 and 13.

The fluid spring 11 has devices 14, 15 for moving this fluid spring in and out (retracting and extending). The fluid spring is built up in such a way that it used only for the vertical adjustment of the vehicle seat as far as a position capable of being pre-determined and is then capable of being blocked or locked in this position.

The fluid spring 11 is fastened by the first end thereof to a component 17 which is made cylindrical. This component 17 in turn is suspended—in a pivotable manner by way of a pivot point 16—on a component 12 fastened to the upper part 5 of the seat as a receiving part 12 for the fluid spring 11.

FIG. 2 is a cut-away view of the vehicle seat according to the invention in the region of the frame. The same and equivalent parts are provided with the same reference numbers.

In addition, it is clearly evident from this illustration according to FIG. 2 that the fluid spring 11 is connected to the component 17 in a fixed manner, wherein the component 17 being mounted so as to be pivotable about an axle 16. The further end of the fluid spring 11 is fastened at the end around a pivot point 13, in which case an axle 13 is connected to the part moving in and out (retracting and extending), i.e. the piston, and the further pivot axle 16 is connected to a piston cylinder of the fluid spring 11 in which the piston moves in and out (retracting and extending) for a vertical adjustment.

In the case of a movement of the vehicle seat directed upwards and downwards for a vertical adjustment, as indicated according to the reference 1a in FIG. 1, a movement of the piston in and out takes place in the piston cylinder of the fluid spring. At the same time a pivoting movement is carried out about the two axles 13 and 16. The frame performs a pivoting movement about the axles 9 and 10.

In the case of a vibration movement of the vehicle seat in the vertical direction, the fluid spring is blocked and the piston is not moved in and out. The vibration movement of the vehicle seat is in fact damped by the component 17 with the resilient material. In the event of deformation in the component 17 with the resilient material by +/−2.5 mm, a spring path of +/−10 mm occurs during the vibration movement of the seat on account of the orientation and articulated suspension of the fluid spring. This corresponds to a translational ratio of 1:35.

A fluid spring for use in the vehicle seat according to the invention is reproduced in FIGS. 3a and 3b in two different lateral positions which are turned by 90° with respect to each other.

It is evident from FIGS. 3a and 3b that the fluid spring essentially consists of the piston cylinder 18 and the piston 19. The first end 20 of the fluid spring is connected to the cylindrical component 17 which has a continuous hole 21 on the inside for receiving a pivot axle 16.

The continuous hole 21 extends in a centralized manner about a centre axis 22 which in turn is situated at a right angle to a longitudinal axis 11a of the fluid spring.

The extension length of the piston 19 can be set in a variable manner by means of an adjustment nut 22a.

The component 17, as has been shown in FIGS. 3a and 3b in conjunction with fluid spring, is reproduced in enlarged illustrations in FIGS. 4a and 4b. The structure of this component 17 is layered with respect to the cylinder shape. Consequently the cylindrical component 17 has a plastics material bush 23 in the form of a hollow cylinder or in the manner of a hollow cylinder, which is adjacent in a bonded or adhesive connection to the intermediate part 24 which is formed as a middle layer between the inner and the outer layer.

The intermediate part 24 consists of a resilient material which can be Cellasto for example. This material is arranged with a 30% pre-stressing force between the plastics material part 23 and the casing part 25. The intermediate part 24 advantageously damps the vibration movements of the vehicle seat when a vibration is initiated from below and in the case of a movement of the vehicle seat directed upwards and downwards on account of the action of force, as can occur for example during a re-covering of the vehicle seat. In this case a deformation of the resilient material according to the intermediate layer 24 occurs with respect to the casing part 25 and the plastics material bush 23. This can take place in any desired direction, so that movements of the vehicle seat directed both upwards and downwards can be damped independently of the momentary orientation of the fluid spring and thus of the component.

A cylindrical component built up in this way has for example a diameter of 36 mm and is formed in the region of a projection 26 with a length of 26 mm between the centre axis of the plastics material bush and the outermost end of the projection. It is preferable for the casing part 25 to be of an aluminium extrusion material.

The component reproduced in FIG. 4a is reproduced in a cross-sectional illustration in FIG. 4b in a sectional illustration along the line A-A. It is evident from this illustration that a continuous opening 21 arranged in a centred manner about the centre axis 22 can have a diameter of for example 15 mm.

An external diameter of the plastics material bush 23 can be 23 mm for example. The intermediate part 24 of plastics material has an external diameter 30.5 mm for example.

The lengths of the component are for example 40 mm with respect to the length of the casing part 25, 26 and of the intermediate part 24, and 49 mm for the length of the plastics material bush 23. The thickness used for the resilient layer, which is preferably pressed with pre-stressing in between the casing part 25 and the plastics material bush 23, can be 3.7 mm.

A threaded bore with the thread size M10 is provided in the projection 26 of the casing part 25, 26 at a right angle to the centre axis 22. This threaded bore 27 is used for receiving a threaded rod arranged at the end of the fluid spring, in order to connect the component 17 to the fluid spring 11 in a durable manner to each other. In this way, a combinatory effect between the fluid spring 11 and the component 17 occurs, which has the result that a vertical adjustment of the vehicle seat can be carried out by means of the fluid spring, so as then to be blocked or locked in this vertical setting which is capable of being pre-determined, and that the damping effect of the resilient layer occurs inside the component 17, which is used for damping vibrations introduced into the frame 4 and the vehicle seat 1 when the fluid spring is blocked.

All the features disclosed in the application documents are claimed as being essential to the invention, insofar as they are novel either individually or in combination as compared with the prior art.

LIST OF REFERENCES 1 vehicle seat
2 backrest
3 seat part
4 frame
5 upper part of the seat
6 lower part of the seat
7, 8 scissor arms, frame
9, 10 axles, fulcrum
11 fluid spring
11a longitudinal axis
12 receiving part for the fluid spring
13 axles, fulcrum
14, 15 devices
16 axles, fulcrum
17 component
18 piston cylinder
19 piston
20 first end of the fluid spring
21 continuous hole
22 centre axis
22a adjustment nut
23 plastics material part
24 element, intermediate part
25 casing part
26 projection
27 threaded bore

The invention claimed is:

1. A vehicle seat comprising an upper part and a lower part and a frame arranged between them and vertically adjustable by means of at least one fluid spring capable of being retracted and extended, with a component with at least one element of resilient material for the damping of vibrating movements of the vehicle seat, wherein the component is connected to a first end of the fluid spring and to the upper part of the seat or the lower part of the seat, wherein the component is built up in the form of a multiple-layer cylinder, wherein the cylinder comprises a plastics material part in the form of a hollow cylinder, an intermediate part of the resilient material in the form of a cylinder jacket arranged thereon and a casing part surrounding the intermediate part in the manner of a cylinder jacket, wherein the casing part comprises metal.

2. The vehicle seat according to claim 1, wherein a centre axis of the cylinder extending in the longitudinal direction extends at a right angle to a longitudinal axis of the fluid spring.

3. The vehicle seat according to claim 1, wherein the intermediate part is glued on the inside at least in sections to the plastics material part and on the outside to the casing part.

4. The vehicle seat according to claim 1, wherein the intermediate part of the resilient material is arranged between the plastics material part and the casing part with pre-stressing as viewed in the radial direction.

5. The vehicle seat according to claim 1, wherein the plastics material part in the form of a hollow cylinder is longer than the intermediate part and the casing part.

6. The vehicle seat according to claim 1, wherein at a right angle to the centre axis of the cylinder the casing part has at least one threaded bore which is used for fastening the casing part to the first end of the fluid spring.

7. The vehicle seat according to claim 1, wherein the casing part consists of metal.

8. The vehicle seat according to claim 1, wherein the resilient material is an elastomer or a PU foam.

9. The vehicle seat according to claim 1, wherein the fluid spring is filled with oil.

10. The vehicle seat according to claim 1, wherein the plastics material part is arranged in a rotatable manner on the upper part of the seat or the lower part of the seat.

11. The vehicle seat according to claim 1, wherein the casing part consists of a metal selected from the group consisting of aluminium continuous casting material and steel.

12. The vehicle seat according to claim 1, wherein the casing part comprises a metal selected from the group consisting of aluminium continuous casting material and steel.

* * * * *